United States Patent [19]

Shirai

[11] 4,411,509
[45] Oct. 25, 1983

[54] TAKE-UP ASSEMBLY FOR AUTOMATIC FILM LOADING OF CAMERA

[75] Inventor: Hitoshi Shirai, Sagamihara, Japan

[73] Assignee: Olympus Optical Company Ltd., Tokyo, Japan

[21] Appl. No.: 331,587

[22] Filed: Dec. 17, 1981

[30] Foreign Application Priority Data

Feb. 13, 1981 [JP] Japan .............................. 56-19422[U]

[51] Int. Cl.³ .............................................. G03B 1/04
[52] U.S. Cl. ................................... 354/212; 242/71.4
[58] Field of Search .................. 354/212, 275, 173; 242/71, 71.4, 71.5, 71.1

[56] References Cited

U.S. PATENT DOCUMENTS

| | | | |
|---|---|---|---|
| 3,377,935 | 4/1968 | Furusawa | 354/212 |
| 3,377,936 | 4/1968 | Goshima et al. | 354/212 |
| 4,274,726 | 6/1981 | Yoneyama et al. | 354/212 |

FOREIGN PATENT DOCUMENTS 40-13083  5/1965  Japan .
52-41378  9/1977  Japan .

*Primary Examiner*—Alan Mathews
*Attorney, Agent, or Firm*—Ostrolenk, Faber, Gerb & Soffen

[57] ABSTRACT

A take-up assembly for automatic film loading comprises a film take-up spool sleeve having a notch window formed therein for receiving a film catch member, a spool shaft rotatably fitted inside the spool sleeve and supported by a camera body so as to present a given magnitude of friction for its rotation relative to the body, a catch member rotatably mounted on the spool shaft and having a pawl which is disposed inside the notch window for fitting engagement with one of perforations formed in a perforated roll film, a first spring for causing the catch member to project out of the notch window during a film loading operation, and a second spring for causing the spool sleeve to rotate through a given angle relative to the spool shaft for receiving the catch member inside the notch window.

7 Claims, 19 Drawing Figures

TAKE-UP ASSEMBLY FOR AUTOMATIC FILM LOADING OF CAMERA

BACKGROUND OF THE INVENTION

The invention relates to a take-up assembly for automatic film loading of camera, and more particularly, to a take-up assembly including a pawl adapted to engage a perforation in a perforated roll film to take up the roll film while drawing it out of a film magazine.

As is well recognized, a mechanism which is used to load a roll of film automatically into a camera can be categorized into two types, one utilizing the friction occurring between a film and a frictionable member such as rubber to load a leader portion of the film onto a take-up spool, and another which utilizes a pawl mounted on the take-up spool and which is adapted to engage a perforation in the film to load the leader portion onto the spool.

In the former arrangement utilizing a frictional member, the rubber material which forms the frictional member has a durability which is less than desired. Hence, even though such mechanism can be practically implemented, the reliability is reduced and the mechanism cannot be used over a prolonged period of use. The use of resilient means to increase the friction between the film and the frictional member is also known, but results in a complex arrangement and vulnerability of the film.

In the latter arrangement utilizing the pawl mounted on the take-up spool, a uniform film winding is not achieved in that during a second turn, a portion of the film is placed over the pawl. In other words, the film of roll is not wound in a truely circular form, but as viewed circumferentially, a portion of the film roll bulges outwardly, resulting in a pool planarity of the film to damage the film or cause an increased load during a film take-up operation.

In addition, it is difficult to achieve an automatic engagement of the pawl with one of the perforations, and the arrangement fails to provide an automatic loading unless the pawl is previously engaged with one of the perforations. If the pawl is engaged with one of the perforations beforehand, the pawl is liable to be disengaged upon initiating the rotation of the spool, causing a difficulty in the operational reliability.

Figure 1:
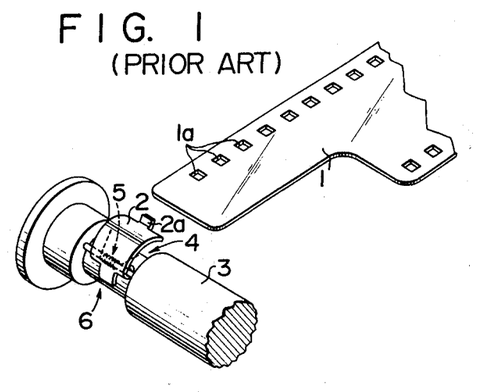
FIG. 1 is a perspective view of an exemplary take-up assembly used for automatic loading of a perforated roll film.

To eliminate the foregoing disadvantages, there has been proposed a take-up assembly for automatic loading of a perforated roll of film as shown in FIG. 1. In this Figure, a perforated roll of film 1, hereafter simply referred to as a film, is formed with perforations 1a adapted to be engaged by a pawl 2a of a catch member 2 which is arranged in a recess 4, formed in a take-up spool 3. The catch member is normally urged by a spring 5 to project out of the recess 4. The arrangement is intended to assure that the pawl 2a automatically engages one of perforations 1a so that the catch member 2 is driven into the recess 4 by the tension in the film 1 as the latter is pulled by the rotation of the take-up spool 3.

However, the described take-up assembly 6 is constructed such that the pawl 2a normally projects beyond the outer diameter of the take-up spool 3 when the film 1 is not disposed thereon. This makes the catch member 2 susceptible to deformation. In particular, as when the take-up spool 3 is rotated in the reverse direction, the pawl 2a may rub against the inner wall of the spool chamber formed in the camera, producing an unpleasant sound resulting from friction, or may be trapped by part of the inner wall to render the rotation of the take-up spool 3 in the reverse direction impossible. Alternatively, if the take-up spool 3 is reversed when the pawl 2a is jammed, the catch member 2 may be disadvantageously broken or deformed. To prevent the pawl 2a from rubbing against the inner wall of the spool chamber, it must be disposed toward the spool 3. However, in this instance, the pawl will engage the perforation 1a formed in the film 1 at a location displaced toward the center of the spool, as viewed lengthwise thereof, disadvantageously causing an unreliable film take-up operation unless an increased length of film 1 is previously withdrawn from the magazine.

SUMMARY OF THE INVENTION

It is an object of the invention to avoid the described disadvantages of the prior art by providing a take-up assembly for automatic film loading of camera including a catch member mounted on a spool shaft and which is normally received inside a notch window formed in a spool sleeve so that as the spool sleeve rotates upon initiation of a film take-up operation, the catch member projects out of the notch window, whereupon the spool sleeve and the spool shaft rotate integrally to allow a pawl formed on the catch member to be engaged with one of perforations formed in the film to take up the film and the catch member is again driven inside the notch window under the tension applied to the film being taken up.

The invention provides a number of advantages mentioned below.

(1) During the initial phase, the catch member is received inside the spool sleeve, and projects toward the film as a take-up operation is initiated. In this manner, the pawl engages the perforation at a location which is displaced toward the film as compared with the conventional arrangement, allowing a reliable take-up operation without requiring an increased length of film to be withdrawn beforehand from the magazine.

(2) The catch member is received inside the notch window formed in the spool sleeve during the normal condition which prevails before a film loading, so that a contact with the catch member is avoided during a film loading operation, thus facilitating a film loading operation and removing the likelihood that the catch member may be deformed.

(3) Since the pawl does not project beyond the outer periphery of the spool sleeve if the latter is manually rotated in the reverse direction, a jamming of the pawl as by the inner wall of the spool chamber to prevent a reverse rotation or a deformation of the pawl is avoided.

(4) During a rewind operation, the catch member moves angularly in a direction to be received inside the notch window formed in the spool sleeve as the film is disengaged from the pawl toward the end of the rewind operation, thus facilitating a disengagement of the film and avoiding any damage which may be caused to the film.

DESCRIPTION OF PREFERRED EMBODIMENTS

Figure 2:
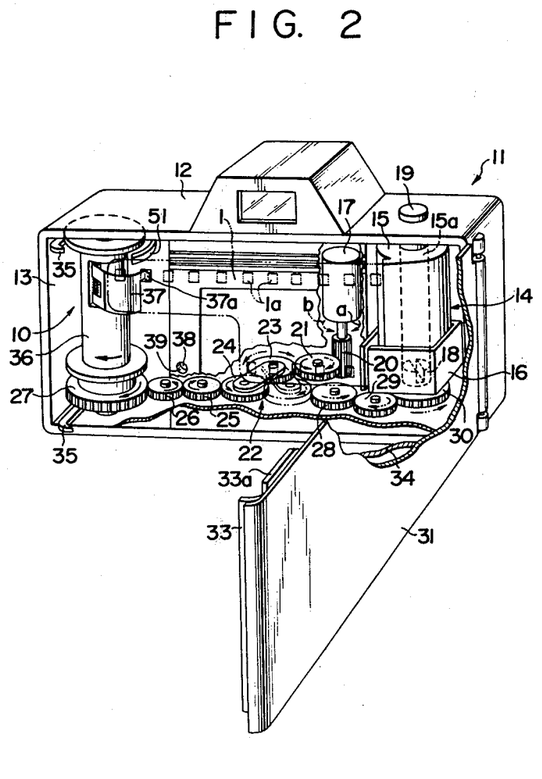
FIG. 2 is a perspective view of a take-up assembly for an automatic film loading of camera according to one embodiment of the invention.
Figure 3:
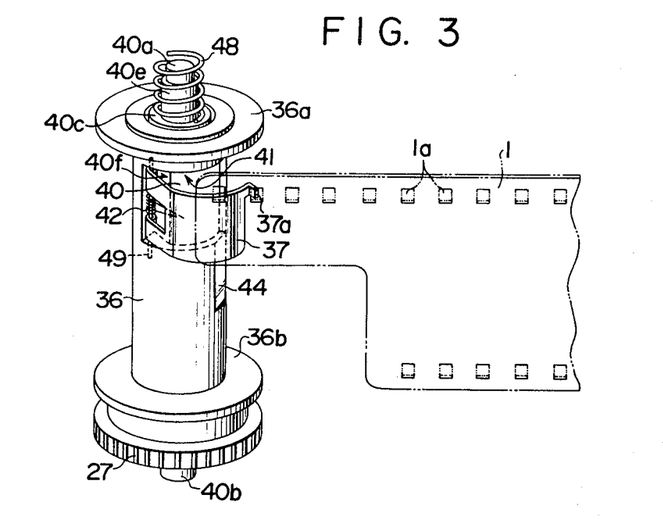
FIG. 3 is an enlarged perspective view of the take-up assembly shown in FIG. 2.

Referring to FIG. 2, there is shown a take-up assembly for automatic film loading of camera according to one embodiment of the invention. The take-up assembly 10 is applied to a camera 11 of automatic film winding and rewind type. The camera 11 includes a body 12, in one side of which is defined a spool chamber 13 adapted to receive the take-up assembly 10. A magazine chamber 14 is defined in the other side of the body 12, and a magazine holding case 16 is disposed therein for receiving a film magazine 15 therein. A motor 17 is disposed within the body 12 adjacent to the magazine chamber 14, and a gearing is disposed between the take-up assembly 10, the case 16 and the motor 17 so that the drive from the motor 17 can be selectively transmitted to the take-up assembly 10 and to a rotary shaft 18 which is disposed within the case 16. The motor 17 can be set in motion so as to rotate in a direction indicated by an arrow a in response to the depression of a pushbutton 19 disposed on the outside of the camera body 12. The drive shaft of the motor 17 is integrally provided with an output gear 20, and the drive from the motor 17 can be sequentially transmitted through a reduction gear 21, the sun gear 23 of a clutch 22, a planet gear 24 thereof and transmission gears 25, 26 while rotating them in respective directions indicated by solid line arrows. The drive is finally transmitted to a drive gear 27 mounted on the take-up assembly 10, thus causing the take-up assembly 10 to rotate in order to take up the film 1. When the rotation of the motor 17 is switched to the opposite direction or to a direction indicated by a broken line arrow b, the drive thereof is transmitted from the gear 20 to the gear 21 and the sun gear 23 of the clutch 22, whereby the planet gear 24 of the clutch switches its meshing engagement from the transmission gear 25 to another transmission gear 28, as indicated by phantom line. Subsequently, the drive is transmitted from the gear 28 to an intermediate gear 29 while rotating the gears in directions indicated by phantom line arrows, and is ultimately transmitted to a gear 30 which is integral with the rotary shaft 18 disposed within the magazine holding case 16. In this manner, the rotary shaft 18 can be rotated to rewind the film 1.

By utilizing a mechanism not shown, the magazine holding case 16 is adapted to tilt to facilitate the loading or removal of the film magazine 15 whenever a rear lid 31 of the camera is opened. Thus, when loading the film 1, the rear lid 31 is opened to thereby tilt the magazine holding case 16 in order to receive the film magazine 15 therein. Subsequently, a film leader portion is pulled out of the magazine 15, and its leading end is disposed so as to overlap the take-up assembly 10 maintained in the spool chamber 13. Subsequently, the lid 31 is closed, whereupon the case 16 and the film magazine 15 retained therein are received within the magazine chamber 14 in a normal manner. A film guide member 33 which is mounted on the inner side of the lid 31 by means of a set screw 32 (see FIG. 4) comes opposite to the spool chamber 13 while a film pressure plate 34 is located in opposing relationship with an image field, thus defining an automatic loading path for the film 1. It is to be understood that a hook 35 provided on the camera body 12 engages a detent 33a which is integral with the film guide member 33 to lock the lid 31 in place when the lid 31 is closed. Subsequently, the pushbutton 19 is depressed to allow a spool sleeve 36, integral with the gear 27 on the take-up assembly 10, to rotate through a given angle in a direction indicated by an arrow, and a catch member 37 then angularly moves toward the film 1, as will be further described later, whereby a pawl 37a forward integrally with the catch member 37 engages one of perforations 1a formed along the upper edge of a film leader portion, allowing a film take-up operation to be initiated. A light detecting element 38 (see FIG. 2) is disposed behind a detection hole 39 (see FIG. 2), which is disposed along the path of perforations 1a formed in the lower edge of the film 1 as it is caught by the catch member 37 and runs to be disposed around the spool sleeve 36, for detecting such perforations 1a. In this manner, after the film leader portion is disposed on the take-up assembly 10, the element 38 counts the number of perforations 1a which have moved past it. When eight perforations 1a are counted by the element 38, corresponding to a running of a film length which is equal to one frame, the rotation of the motor 17 is stopped.

When the full length of the film contained in the film magazine 15 has been withdrawn therefrom to cease the running of the film 1 and the element 38 fails to provide any further count pulse corresponding to perforations 1a, over a given time interval, the motor 17 reverses to initiate a film rewind operation. Thus, when the motor 17 rotates in a direction indicated by the phantom line arrow b, the gear 30 rotates in a phantom line direction, whereby the rotary shaft 18 integral with the gear 30, and hence a take-up shaft 15a disposed in the film magazine 15 and meshing therewith, rotates in the same direction, thus rewinding the film. Toward the end of the film rewind operation which takes place by the rotation of the take-up shaft 15a, the pawl 37a is automatically disengaged from one of perforations formed in the upper edge of the film leader portion, and all of the perforations 1a formed in the lower edge of the film 1 have moved past the location of the element 38. Hence, the rotation of the motor 17 is stopped, terminating a rewind operation.

Considering the construction of the take-up assembly 10 in more detail, it is shown to an enlarged scale in FIGS. 3 to 6. As shown, the drive gear 27 is integrally formed with the lower end of the spool sleeve 36, in which a spool shaft 40 is rotatably fitted. The catch member 37 is mounted on the spool shaft 40 in a rotatable manner, and a first spring 42 urges the catch member 37 in a direction to cause it to project through a notch window 41 formed in the spool sleeve 36. In addition, a second spring 43 (see FIGS. 5 and 6) is disposed between the spool sleeve 36 and the spool shaft 40 for urging the spool sleeve 36 to rotate counterclockwise about the spool shaft 40, or in the opposite direction from the film take-up direction so as to rotate it to a given position.

The spool sleeve 36 includes an upper end flange 36a, and the notch window 41 is formed by providing a strip-shaped notch which extends substantially 180° in the circumferential direction toward the flange 36a. An end face 41a of the notch window 41 (see FIG. 4) which is located at the counterclockwise end thereof extends in a plane perpendicular to the circumferential surface. However, the other end face 41b (see FIG. 4) which is located at the clockwise end of the notch window 41 is formed to extend in a plane which is approximated by a tangent to the inner peripheral surface of the spool sleeve 36. The thickness of the spool sleeve 36 is reduced or shaved in a region 44 adjacent to the end face 41a and above and below the notch window 41 over an axial length which is greater than the width of the film leader portion. The spool sleeve 36 includes a lower end flange 36b of a diameter greater than the outer diameter of the spool sleeve 36, and its lowermost portion is integrally formed with the drive gear 27 which is used to transmit the rotation in the take-up direction to the spool sleeve 36. In a region corresponding to the gear 27, the inside of the lower end flange 36b is formed with an arcuate groove 46, located around the spool shaft 40, (see FIGS. 5 and 6) to receive the second spring 43 and a stop 45. The arcuate groove 46 which is formed in the bottom surface of the spool sleeve 36 extends substantially over 180° and approximately one-half thereof is formed as a groove portion 46a of a reduced radial width to receive the second spring 43 therein, which comprises a coiled spring. As will be described later, the remainder of the arcuate groove 46 is utilized to guide the second spring 43 and the stop 45 as the spool sleeve 36 rotates, and hence is formed as a groove portion 46b of an increased radial width. At the end of the groove portion 46a remote from the groove portion 46b, a set screw 47 is secured to the bottom surface of the spool sleeve 36 to anchor one end of the second spring 43.

Figure 5:
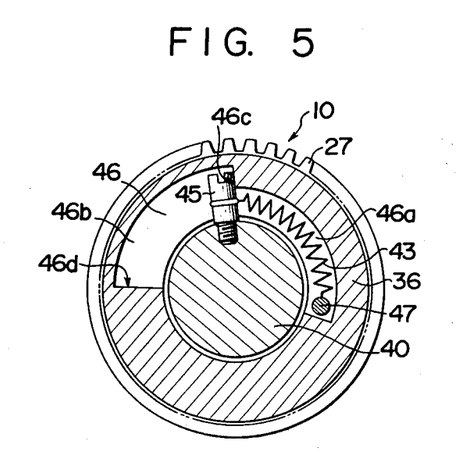
Figure 6:
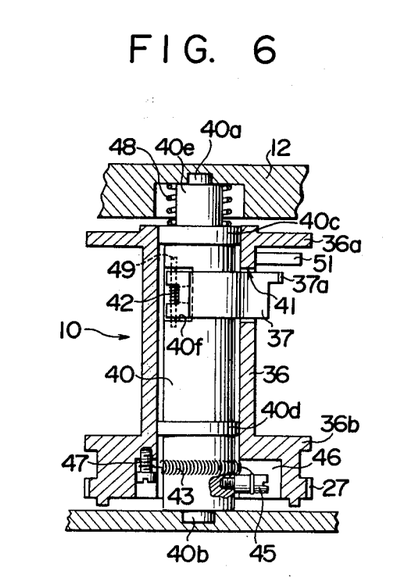

As shown in FIG. 6, the spool shaft 40 extends through the spool sleeve 36 and is provided with a pair of support stud 40a, 40b on its upper and lower ends, which are fitted into recesses formed in the camera body 12, whereby the spool shaft 40 is rotatably disposed within the spool chamber 13 together with the spool sleeve 36. Adjacent to its upper and lower ends, the spool shaft 40 is formed with radial extensions 40c, 40d, which are adapted to bear against the inner surface of the spool sleeve 36. A coiled spring 48 is disposed on a shaft portion 40e located intermediate the upper extension 40c and the upper support stud 40a, and is maintained in compression, whereby the both ends of the spring 48 bear against the camera body 12 and the upper end face of the radial extension 40c on the spool shaft 40, thus producing friction between the spool shaft 40 and camera body 12 as the shaft 40 tends to rotate. Adjacent to the lower end of the spool shaft 40 or at an elevation corresponding to the arcuate groove 46 formed in the spool sleeve 36, a screw, which defines the stop 45, is secured to the spool shaft 40 so as to project into the groove portion 46b. The second spring 43, formed by a coiled tension spring, is disposed within the groove portion 46a and extends between the stop 45 and the screw 47. As a result of providing the second spring 43, the spool sleeve 36 is urged to rotate counter-clockwise relative to the spool shaft 40, as viewed in FIG. 5, whereby a step 46c defined between the groove portions 46a, 46b abuts against the stop 45, defining an angular position where the spool sleeve 36 comes to a stop.

Figure 4:
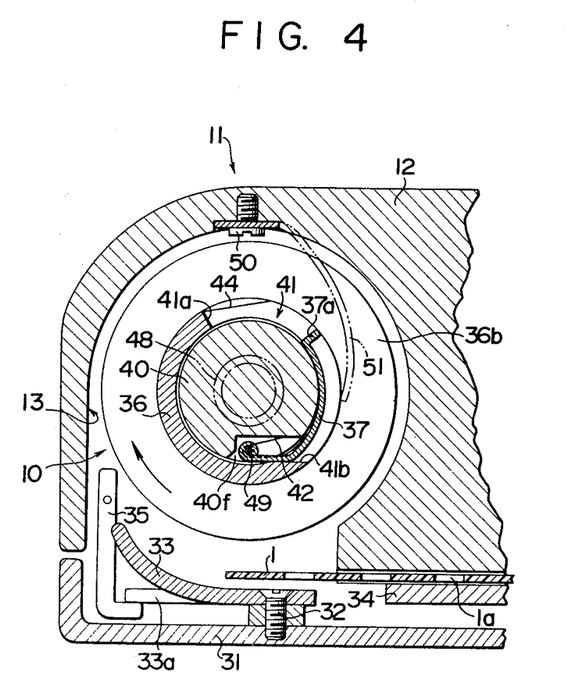
FIGS. 4, 5 and 6 are cross sections, to an enlarged scale, of part of the take-up assembly shown in FIGS. 2 and 3.

Referring to FIGS. 4 and 6, it will be seen that the surface of the sleeve shaft 40 is partly shaved to define a recess 40f at an elevation corresponding to the notch window 41 formed in the spool sleeve 36, and a support pin 49 is secured in the recess 40f in parallel relationship with the axis of the sleeve shaft 40. One end of the catch member 37 is rotatably disposed around the support pin. The catch member 37 is formed by a flat sheet material, and is planar toward said one end while the remainder thereof inclusive of the free end from which the pawl 37a extends is curved with a curvature which is substantially equal to that of the peripheral surface of the spool shaft 40. The pawl 37a is folded outwardly at right angles to the curved plane of the catch member 37. The first spring 42 is formed by a torsion spring, and is disposed on the support pin 49, with its one end abutting against the spool shaft 40 in the region of the recess 40a and its outer end abutting against the inner surface of the catch member 37. In this manner, the catch member 37 is urged by the spring 42 to rotate about the support pin 49 in a direction away from the spool shaft 40.

It is to be noted that while the first spring 42 normally urges the catch member 37 in an opening direction or away from the spool shaft 40, but the second spring 43 urges the spool sleeve 36 counter-clockwise relative to the spool shaft 40 until the step 46c assumes an angular position defined by the stop 45, so that it will be seen from FIG. 4 that the planar portion of the catch member 37 bears against the end face 41b, located at the clockwise end of the notch window 41 formed in the spool sleeve 36. In this manner, the catch member 37 is held closed or tight against the spool shaft 40, against the bias of the first spring 42. When the catch member 37 is closed, it is received inside the notch window 41, and the pawl 37a does not project beyond the outer periphery of the spool sleeve 36. Unless a winding drive from the motor 17 is transmitted to the spool sleeve 36 as will be described later, the catch member 37 is maintained closed as shown, and the pawl 37a does not project beyond the outer periphery of the spool sleeve 36. Hence, a contact of the catch member 37 with some other elements to cause a breakage or deformation is avoided.

A leaf spring 51 is mounted on the camera body 12 within the spool chamber 13 by means of a set screw 50 for preventing a curling of the film leader portion in an opposite direction during the initial phase of winding the film leader portion around the spool sleeve 36, thus allowing the leader portion to be disposed accurately around the outer periphery of the spool sleeve 36. It will be noted that the leading end of the leaf spring 51 is located close to or in gentle contact with the periphery of the spool sleeve 36.

Figure 7A:
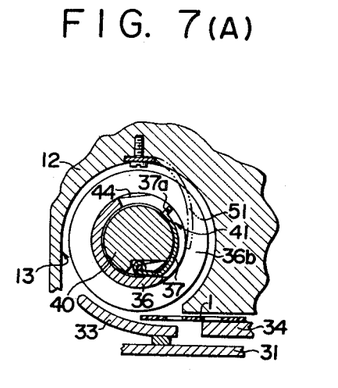
FIGS. 7(A), (B), 8(A) and (B), 9(A) and (B), 10(A) and (B), 11(A) and (B) and 12(A) and (B) are cross sections of related parts, illustrating different operational conditions of the take-up assembly shown in FIGS. 2 and 3.

An operation of the automatic film loading take-up assembly will now be described with reference to FIGS. 7(A) to 12(B). The film magazine 15 (see FIG. 2) is disposed in the magazine holding case 16 which is disposed in the magazine chamber 14. A film leader portion is pulled out of the magazine 15, and its leading end is located opposite to the spool chamber 13. The rear lid 31 of the camera may then be closed as shown in FIGS. 7(a) and (B). Under this condition, no rotating drive from the motor 17 is transmitted to the spool sleeve 36, which therefore remains stationary, as indicated in FIGS. 4 and 5. Accordingly, the catch member 37 remains closed.

Figure 8A:
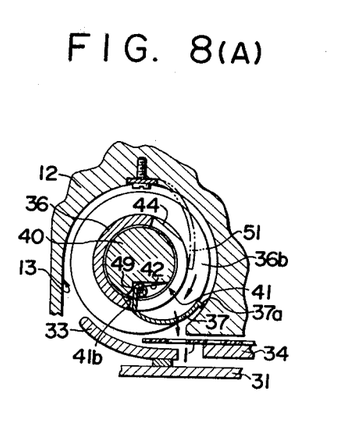
Figure 8B:
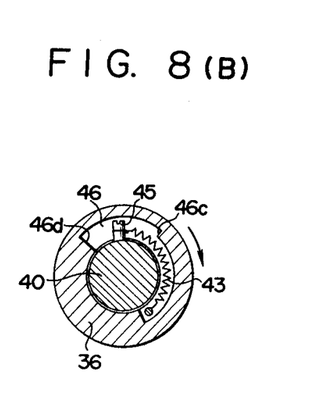

When the pushbutton 19 (see FIG. 2) is depressed to transmit the rotating drive from the motor 17 to the drive gear 27, the spool sleeve 36 rotates clockwise. At this time, the spool shaft 40 remains stationary because of the friction produced by the coiled spring 48 acting between the camera body 12 and the shaft 40. Specifically, the magnitude of such friction is chosen to be greater than the resilience of the second spring 43, and accordingly only the spool sleeve 36 initially rotates, compressing the second spring 43, while the spool shaft 40 remains stationary. FIGS. 8(A) and (B) illustrate such condition. As a result of only the spool sleeve 36 rotating clockwise, the step 46c formed in the arcuate groove 46 moves away from the stop 45. Also at this time, the end face 41b of the notch window 41 is displaced clockwise, slightly moving away from the catch member 37, whereby the catch member 37 which has been constrained from angularly movement by the end face 41b is now allowed to rotate clockwise about the support pin 49 under the resilience of the first spring 42. As a result of clockwise movement of the catch member 37, the pawl 37a is allowed to move outwardly through the notch window 41 until its portion adjacent to the end disposed around the pin bears against the end face 41b. The pawl 37a on the free end of the catch member 37 then is located close and opposite to the inner wall of the spool chamber 13.

Figure 9A:
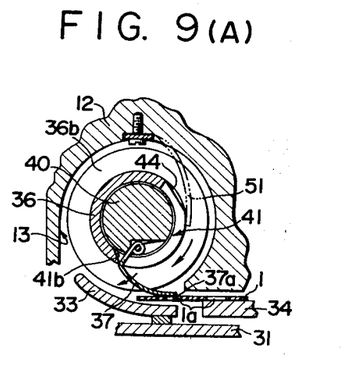
Figure 9B:
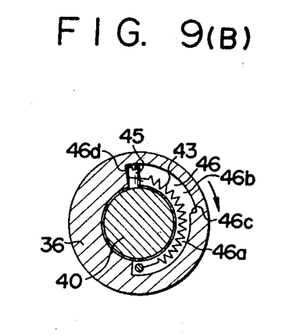

As only the spool sleeve 36 continues to rotate clockwise by the drive from the motor 17 until the inner end face 46d of the arcuate groove 46, located nearer the groove portion 46b, abuts against the stop 45 as shown in FIG. 9(B), the end face 41b of the notch window 41 is further removed away from the catch member 37, as shown in FIG. 9(A), allowing the catch member 37 to move angularly to a further extent than that shown in FIG. 8(A). Hence, the pawl 37a moves outwardly and away from the inner wall surface of the spool chamber 13. The catch member 37 is now opened to its greatest extent, and the pawl 37a projects outwardly beyond the outer periphery of the flanges 36a, 36b on the spool sleeve 36, moving into the path of running of the film 1. As a consequence, if there is a perforation 1a formed in the film leader portion in the region to which the pawl 37a has moved, the pawl 37a can be engaged with the perforation 1a. If the perforation 1a is misaligned from the location of the pawl 37a which has moved to the position shown in FIG. 9(A), a positive engagement between the pawl 37a and the perforation 1a is assured by a subsequent integral rotation of the spool sleeve 36 and the spool shaft 40.

Figure 10A:
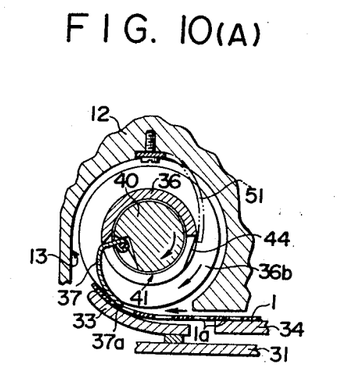
Figure 10B:
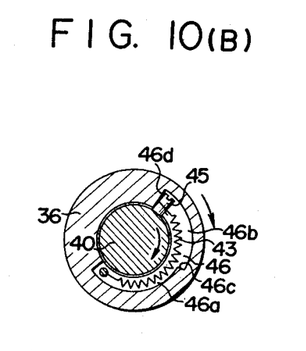

After the inner wall surface 46d of the arcuate groove 46 moves into abutment against the stop 45 through the rotation of the spool sleeve 36 alone, the spool shaft 40 also rotates clockwise in integral manner with the spool sleeve 36, as shown in FIGS. 10(A) and (B). Since the catch member 37 having the pawl 37a engaged with one of the perforations 1a formed in the film 1 rotates integrally with the spool shaft 40, the film 1 begins to run in a direction indicated by an arrow, which means the initiation of an automatic film loading operation.

Figure 11A:
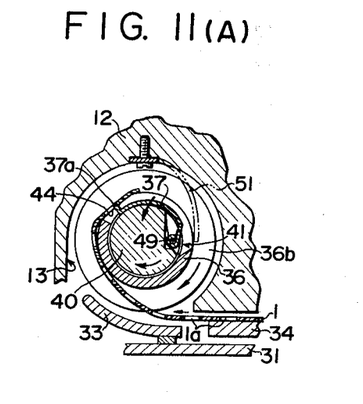
Figure 11B:
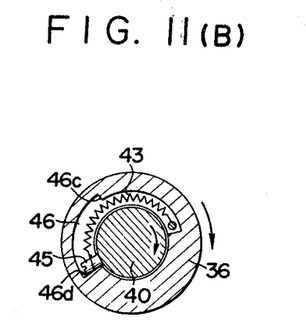

As the spool sleeve 36 and the spool shaft 40 rotate together in the direction of the arrow and the catch member 37 reaches a position illustrated in FIGS. 11(A) and (B) where it is located on the side of the spool shaft remote from the rear lid 31, the tension in the film 1 causes the catch member 37 to rotate counter-clockwise about the support pin 49, and thus allows it to be received inside the notch window 41. Accordingly, the film leader portion having one of its perforations 1a engaged by the pawl 37a is wrapped directly around the periphery of the spool sleeve 36.

Figure 12A:
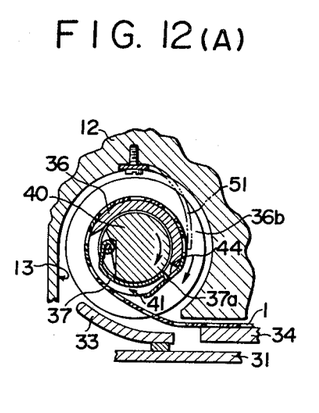
Figure 12B:
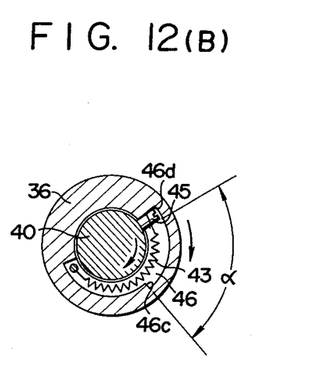

Subsequently, as the spool sleeve 36 and the spool shaft 40 continue to rotate integrally and the leading end of the film 1 has moved past the leaf spring 51, the film 1 is then orderly wrapped around the periphery of the spool sleeve 36, as indicated in FIGS. 12(A) and (B). Referring to FIG. 12(B), the fact that the spool sleeve 36 is offset by an angle α clockwise from its initial condition (see FIGS. 7(A) and (B)) when no rotating drive is transmitted to the spool 36, as considered relative to the spool shaft 40, allows the pawl 37a to be located on the right side of the notch window 41 in alignment with the region 44 of a reduced thickness disposed above and below the window (see FIGS. 3 and 4), thereby assuring a positive engagement between the pawl 37a and one of the perforations 1a in the film 1 and simultaneously preventing successive turns of the film from bulging in an elliptical manner in such region. In this manner, the take-up assembly 10 positively takes up the film 1 pulled out of the film magazine 15, frame by frame.

During a rewind operation, the film 1 runs in the opposite direction from that mentioned above. The tension in the film 1 running in this direction causes an opposite or counter-clockwise rotation of the spool sleeve 36 and the spool shaft 10, generally by a procedure which is opposite to that mentioned above in connection with FIGS. 7(A) and 12(B). At or around a point illustrated in FIGS. 10(A) and (B), the pawl 37a is disengaged from the perforation 1a, whereupon the resilience of the second spring 43 causes the spool sleeve 36 to rotate counter-clockwise relative to the spool shaft 40, thus automatically withdrawing the catch member 37 to its initial position within the notch window 41 immediately.

Figure 7B:
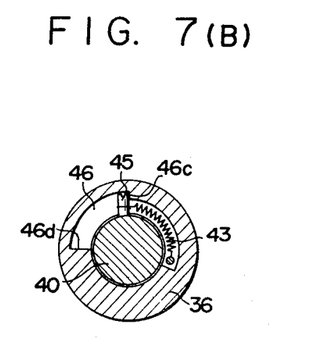

In the described embodiment, the position of the take-up assembly 10 at the initiation of a take-up operation is not limited to the rotational position of the spool sleeve 36, the spool shaft 40 and the catch member 37 under the initial condition illustrated in FIGS. 7(A) and (B). Rather, it should be understood that the take-up assembly 10 takes up the film 1 in a positive manner from any rotational position assumed initially.

In the desired embodiment, a single catch member 37 is employed, but alternatively a plurality of such catch members may be used.

Figure 13:
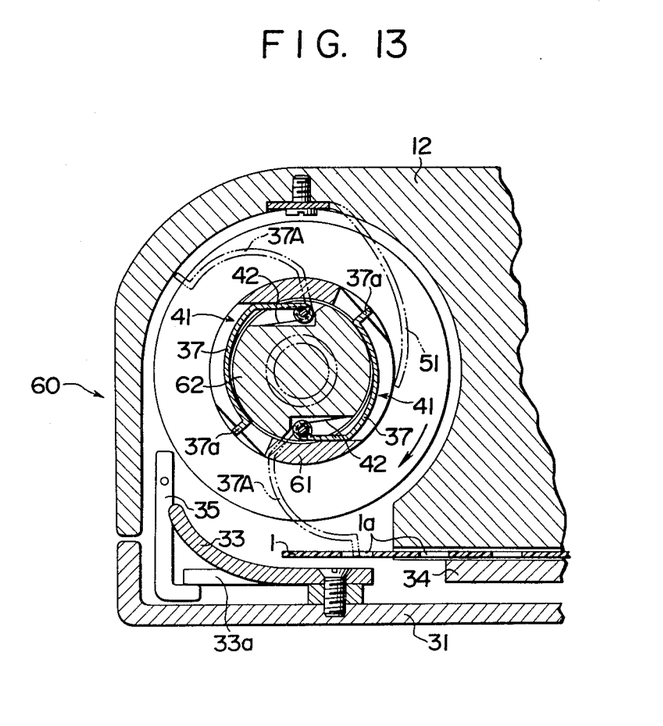
FIG. 13 is an enlarged cross section of parts of a take-up assembly for automatic film loading of camera according to another embodiment of the invention.

FIG. 13 is a cross section of a take-up assembly according to another embodiment of the invention. In the take-up assembly 60, spool sleeve 61 is formed with a pair of notch windows 41 which are displaced from each other by 180° and which are thus located opposite to each other. At an elevation corresponding to the notch windows 41, a spool shaft 62 is provided with a pair of catch members 37 which are again displaced from each other by 180°. The notch windows and the catch members ae constructed in the similar manner as mentioned in connection with the previous embodiment. Accordingly, with the take-up assembly 60, during a clockwise rotation of the spool sleeve 61, the pair of catch member 37 project out of the notch windows 41 to their open position indicated by phantom lines 37A. Thus, whichever catch member 37 may come first close to the perforation 1a formed adjacent to the leading end of the film 1, its pawl 37a is engaged therewith, thus initiating an automatic film loading operation more rapidly and reliably than with the take-up assembly 10 of the previous embodiment.

In the described embodiments, the application of the invention to an automatic film winding camera in which a rotating drive from a motor is transmitted to a spool sleeve have been shown and described above, but it should be understood that the invention is equally applicable to a camera in which a film winding and rewind takes place manually.

What is claimed is:

1. A take-up assembly for automatic film loading of camera, comprising:
    a sleeve having a notch window formed therein for receiving a film catch member therein and adapted to rotate to take up a perforated film therearound in response to a rotating drive transmitted thereto;
    a spool shaft rotatably fitted inside the spool sleeve and supported within a camera body;
    friction means for providing a resistance of a given magnitude to the rotation of the spool shaft with respect to the camera body;
    a film catch member mounted on the spool shaft so as to be exposed through the notch window formed in the spool sleeve and having a pawl for fitting engagement with one of perforations formed in the perforated film, the catch member initially having its pawl engaged with one of the perforations and subsequently being received inside the notch window by the action of a tension in the film which is produced as the spool shaft rotates;
    a first spring normally urging the catch member in a direction to permit the pawl to move away from the spool shaft and to project through the notch window;
    a second spring disposed between the spool sleeve and the spool shaft to provide a connection therebetween, and operative, during times other than a film loading operation, to urge the spool sleeve to rotate through a given angle relative to the spool shaft in a direction opposite from a film take-up direction so that part of the spool sleeve constrains the catch member to maintain it inside the notch window against the resilience of the first spring; and
    engaging means responsive to a rotating drive applied to the spool sleeve in order to take up the film, by causing the spool sleeve to rotate through the given angle in the film take-up direction against the resilience of the second spring to thereby release the constraint exerted upon the catch member by the spool sleeve and to allow the catch member to rotate under the resilience of the first spring until it reaches a position where it is engageable with one of the perforations, the engaging means subsequently acting to cause an integral rotation of the spool sleeve and the spool shaft.

2. A take-up assembly according to claim 1 in which the engaging means comprises an arcuate groove formed in the inner surface of the spool sleeve toward its lower end, the groove being in the form of a circular segment with respect to the axis of the spool sleeve, the arcuate groove including a groove portion having a reduced radial width and another groove portion continuing with the first mentioned groove portion and having an increased radial width, and a stop pin fixedly mounted on the spool shaft and disposed within the groove portion of the increased radial width for controlling the angle of rotation of the spool sleeve relative to the spool shaft, the second spring being formed by a coiled tension spring disposed within the groove portion of the reduced radial width and having its one end anchored to the stop pin and its other end anchored to the spool sleeve.

3. A take-up assembly according to claim 2 in which the groove portion of the increased radial width subtends an angle which controls the angle of rotation of the spool sleeve as it rotates relative to the spool shaft.

4. A take-up assembly according to claim 1 in which the spool sleeve is provided with an upper and a lower flange, with a drive gear being formed on a portion of the spool sleeve which is disposed below the lower flange and to which a rotating drive is transmitted, the notch window for receiving the catch member being formed at a circumferential position thereof which is located opposite to a film leader portion before the latter is disposed on the spool sleeve.

5. A take-up assembly according to claim 1 in which the spool shaft has an upper and a lower support end which are rotatably fitted into corresponding recesses formed in the camera body, the spool shaft being also formed with an upper portion of an increase diameter, and wherein a coiled spring which is axially compressed is disposed on the spool shaft intermediate the portion of the increased diameter and the upper end support, whereby the spool shaft is supported by the camera body so as to present a friction of a given magnitude for its rotation with respect to the camera body.

6. A take-up assembly according to claim 1 in which the catch member comprises a flat sheet having its one end rotatably mounted on a support pin which is in turn secured to the spool shaft, the remainder of the catch member extending into the notch window formed in the spool sleeve and being curved with a curvature which is substantially equal to that of the peripheral surface of the spool shaft, with its free end being folded outwardly to define the pawl.

7. A take-up assembly according to claim 1 in which the first spring comprises a torsion spring disposed on a support pin associated with the catch member, the torsion spring having its one end disposed for abutment against the spool shaft and its other end disposed for abutment against the inner surface of the catch member.

* * * * *